(12) United States Patent
Springer

(10) Patent No.: US 10,931,920 B2
(45) Date of Patent: Feb. 23, 2021

(54) AUTO-LEARNING SMART TOURS FOR VIDEO SURVEILLANCE

(71) Applicant: Pelco, Inc., Clovis, CA (US)

(72) Inventor: Derek G. Springer, Fresno, CA (US)

(73) Assignee: PELCO, INC., Fresno, CA (US)

( * ) Notice: Subject to any disclaimer, the term of this patent is extended or adjusted under 35 U.S.C. 154(b) by 746 days.

(21) Appl. No.: 13/827,460

(22) Filed: Mar. 14, 2013

(65) Prior Publication Data

US 2014/0267706 A1 Sep. 18, 2014

(51) Int. Cl.
*H04N 7/18* (2006.01)
*G08B 13/196* (2006.01)

(52) U.S. Cl.
CPC ........... *H04N 7/18* (2013.01); *G08B 13/1963* (2013.01); *H04N 7/183* (2013.01)

(58) Field of Classification Search
USPC ....................................................... 348/143
See application file for complete search history.

(56) References Cited

U.S. PATENT DOCUMENTS

| 7,312,814 | B2* | 12/2007 | Bopp | H04N 7/181 |
| | | | | 348/143 |
| 7,349,008 | B2* | 3/2008 | Rui | H04N 7/181 |
| | | | | 348/169 |
| 7,777,783 | B1* | 8/2010 | Chin et al. | 348/211.99 |
| 8,312,133 | B2* | 11/2012 | Kurosawa | H04N 7/17318 |
| | | | | 348/143 |
| 8,619,140 | B2* | 12/2013 | Brown | G01S 3/7865 |
| | | | | 348/154 |
| 2003/0202101 | A1* | 10/2003 | Monroe | G08B 13/19689 |
| | | | | 348/156 |
| 2007/0039030 | A1* | 2/2007 | Romanowich | G08B 13/19608 |
| | | | | 725/105 |
| 2008/0036860 | A1* | 2/2008 | Addy | G08B 13/19652 |
| | | | | 348/143 |
| 2008/0291279 | A1* | 11/2008 | Samarasekera | G08B 13/19693 |
| | | | | 348/159 |
| 2008/0292140 | A1* | 11/2008 | Morris et al. | 382/103 |
| 2008/0294990 | A1* | 11/2008 | Morris et al. | 715/719 |

(Continued)

FOREIGN PATENT DOCUMENTS

WO WO 2011/063527 A1 6/2011

OTHER PUBLICATIONS

Athena, Tsai, "How to Configure Ptz Functions", Apr. 7, 2010, ACTi Connecting Vision, Installation & Configuration Note, Streaming & Networking, Preveiw, Intergration, Application, Model ACM-8511,ACM-82X1, p. 1-12.*

Vicon, "Using Vicon PTZ Dome Cameras", Dec. 5, 2003, Vicon PTZ instruction Guide, Using the V1411X-DVC with a S2000 or S1000 or SVFT dome, Panarama.tripod.com, pp. 1-5.*

(Continued)

*Primary Examiner* — Susan E. Hodges
(74) *Attorney, Agent, or Firm* — Tutunjian & Bitetto, P.C.

(57) ABSTRACT

Traditional approaches to automated monitoring using a pan-tilt-zoom (PTZ) video security system involve the use of programmed patterns/preset tours. In contrast, a camera tour is configured based on operation of a surveillance system during a period of active operation by a user. The configuration accounts for frequency of given views and other measures to provide an automated tour. The automated tour is displayed when the system is not under active control, and can be updated during further periods of active control.

20 Claims, 7 Drawing Sheets

(56) References Cited

U.S. PATENT DOCUMENTS

| | | | |
|---|---|---|---|
| 2009/0083666 A1* | 3/2009 | Fitzmaurice | G06F 3/04815 715/834 |
| 2010/0033566 A1* | 2/2010 | Drive | G08B 13/196 348/143 |
| 2010/0042923 A1* | 2/2010 | Barcay | G06T 19/003 715/715 |
| 2011/0149072 A1* | 6/2011 | McCormack | 348/143 |
| 2011/0175999 A1* | 7/2011 | McCormack | H04N 5/23203 348/143 |
| 2012/0079406 A1 | 3/2012 | Medhurst | |
| 2012/0098927 A1* | 4/2012 | Sablak | G08B 13/19604 348/36 |
| 2012/0281095 A1* | 11/2012 | Trenciansky | H04N 7/18 348/159 |
| 2014/0078300 A1* | 3/2014 | Tine | G08B 13/196 348/143 |

OTHER PUBLICATIONS

Notification of Transmittal of the International Search Report and the Written Opinion of the International Searching Authority, dated Jun. 12, 2014, from International Application No. PCT/US2014/024645, filed Mar. 12, 2014, "Auto-Learning Smart Tours for Video Surveillance."

International Preliminary Report on Patentability, issued Sep. 15, 2015, for International Application No. PCT/US2015/024645, filed Mar. 12, 2014, "Auto-Learning Smart Tours for Video Surveillance."

\* cited by examiner

AUTO-LEARNING SMART TOURS FOR
VIDEO SURVEILLANCE

BACKGROUND OF THE INVENTION

Traditional approaches to unmanned monitoring using a pan/tilt/zoom (PTZ) video security unit involve the use of programmed patterns/preset tours. Setup for these patterns/preset tours must be done on an individual basis for each unit and for each area that the operator determines should be monitored. This method is both time consuming and limited in its inability to adapt to changing conditions.

SUMMARY OF THE INVENTION

Embodiments of the present invention provide a system and method of operating a video surveillance system. A period of active control of a video surveillance system by an operator is detected. During this period, a plurality of operations performed by the operator are monitored. A tour may then be configured based on at least a subset of the plurality of operations. Outside the period of active control, the tour may be initiated to provide an automated tour with the surveillance system.

In further embodiments, detecting the period of active control may include detecting a minimum threshold of activity by the operator. Configuration of the tour may include at least one of a sequence of camera views, coordinates of a camera view, and a display time for each camera view. The coordinates of a camera view may indicate at least one of a pan, tilt, and zoom of a camera, and may correspond to a camera view monitored during the period of active control or to a relative priority of each camera view based on the plurality of operations.

In still further embodiments, cameras of the surveillance system can be controlled to obtain a camera view of the sequence of camera views, where the pan, tilt, and zoom of the camera can be controlled. Monitoring the operations of a user can include selecting a subset of the operations, based on metrics such as display time of a camera view and zoom level of a camera. Operations can be excluded from selection based on thresholds of at least one of a minimum display time, minimum camera zoom, and maximum camera zoom. The camera operations can include coordinates of a camera view and display time of the camera view, where the coordinates indicate pan, tilt, and zoom of a camera controlled by the operator. The tour can be repeated continuously while the surveillance system is not under active control by a user, and the tour can be terminated in response to detecting activity by the operator.

In further embodiments, a computer-readable medium is provided. The computer-readable medium may provide instructions to a computer controlling a video surveillance system, instructing the computer to detect a period of active control of a video surveillance system by an operator, and then monitor a plurality of operations performed by the operator during the period of active control. The instructions may then provide to configure a tour based on at least a subset of the plurality of operations, and initiate the tour outside the period of active control

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
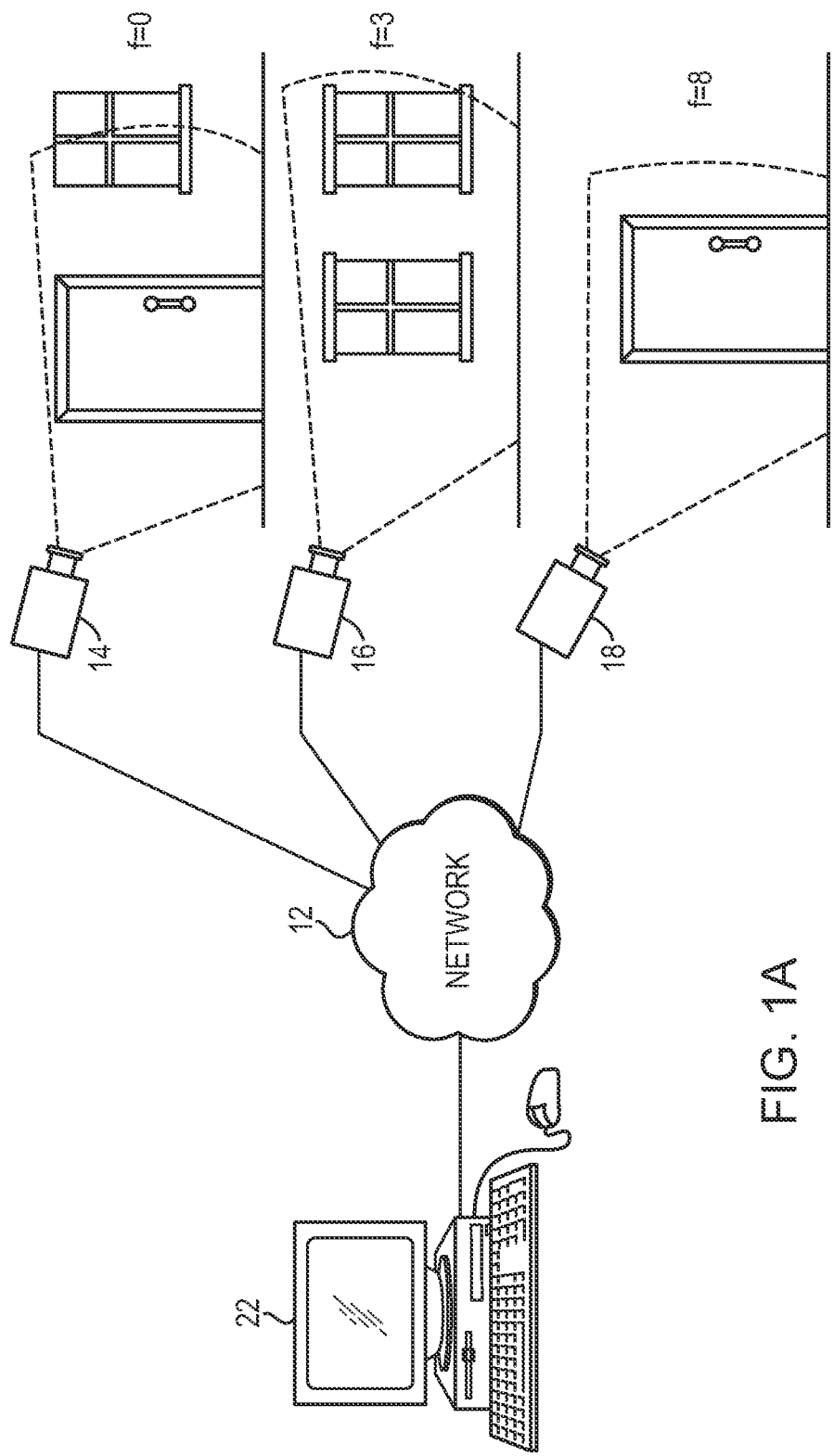
FIG. 1A is a diagram illustrating an example scene in which an embodiment of a surveillance camera tour according to an embodiment of the invention may be employed.

A description of example embodiments of the invention follows. The present application pertains generally to video surveillance and, in particular, to configuring a sequence of camera positions, known in the art as a tour or pattern, of a camera.

Current implementations of pattern or preset tours require considerable operator configuration and do not automatically cover frequently monitored ("key") viewable areas of the surveillance system. In order for a system operator to have specific "key" areas of interest viewable by the unit monitored, when not controlling the unit, the operator must first program a pattern or preset tour with positions at each "key" area. The user can then have that pattern/preset tour called as part of a park, power-up, or manually initiated action.

There are several problems that can arise with this method. First, the user may not know what areas are "key" areas to monitor with the camera. For example, a camera may be installed in a public square area at a local theme park. At the time of installation, it is not known where the majority of foot traffic occurs. Any pattern/preset tour designed to capture video in these high traffic areas can not be set up until someone monitors and tracks foot traffic in that area. Second, "key" areas of interest may change over time. Continuing the example above, if the high traffic areas change as new theme park attractions get added, that change in traffic has to be observed and detected. Once detected, the pattern has to be re-programmed to capture the new high traffic areas.

A third problem is that user error may occur when programming the pattern/preset tour to capture the "key" areas. The programmer of the pattern/preset tour might program the wrong preset position to go to as one of the "key" areas to cover. Lastly, a fourth problem is that, if the user wants to spend a proportional amount of time in each "key" area, relative to the amount of time they spend during manual control of the unit, it would be nearly impossible to set up this behavior using current methods. If the proportion of time spent monitoring each of the "key" areas changes over time, any previously programmed pattern/tour will no longer represent this proportion.

Example embodiments of the present invention provide for operation of a surveillance system by dividing the 3D space where the unit operates (Azimuth/Elevation) into many sector areas. As the user pans, tilts, and zooms, the unit keeps track of what sectors are most important when actively controlled by an operator. Importance is based on several factors configurable by the operator, but in general are the sectors operated in the most during active operator control. Once the operator ceases active control of the system, a "smart tour" can issue via a special preset, a power-up/park action, or a scheduled event.

As a result, the surveillance system operating PTZ (Pan Tilt Zoom) security cameras "learn" what sectors or scenes are of highest interest to monitor, automatically, and "tour" those areas when not actively being controlled by the operator. The top sectors used in the tour stay current because the disclosed method determines the tour sectors based on historical usage data acquired during operator control. The unit automatically adjusts the tour sectors if operators begin to monitor other sectors more frequently.

FIG. 1A is a diagram illustrating an example scene in which an embodiment of a surveillance camera tour according to an embodiment of the invention may be employed. Here, a plurality of cameras 14, 16, 18 are configured to capture video views of respective scenes (e.g., scenes at the outside front, side and rear of a building). A workstation 22 connects to the cameras 14, 16, 18 across a network 12 to view the video scenes and control the cameras 14, 16, 18 (e.g., by adjusting pan, tilt and zoom). An automated tour, operated by the workstation 22, may include displaying a sequence of views captured by each of the cameras 14, 16, 18. For example, the tour may display a view captured by camera 14 at t=0, may display a view captured by camera 16 at t=3, and may then display a view captured by camera 18 at t=8.

Figure 1B:
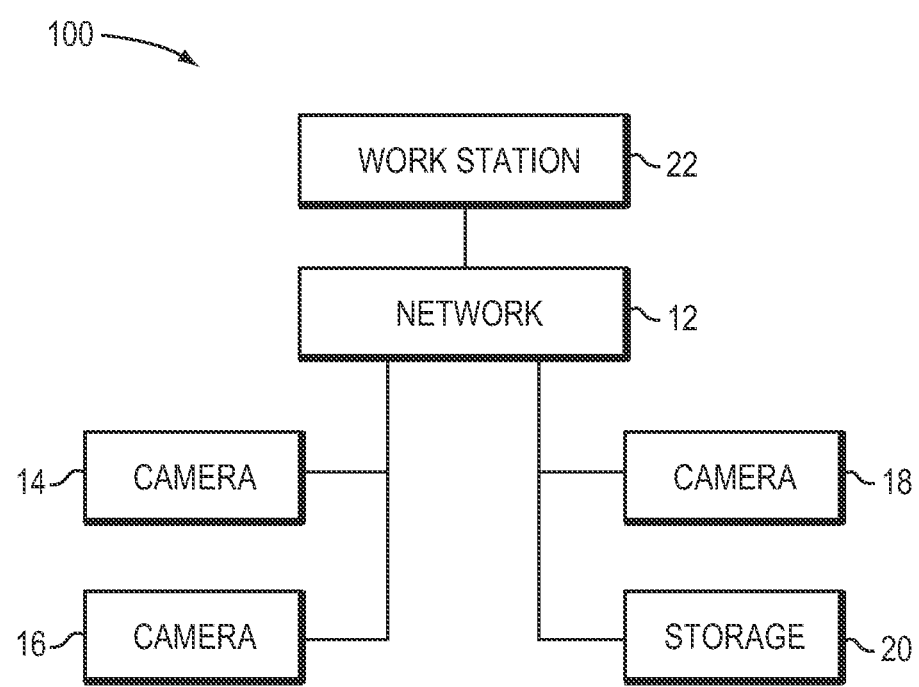
FIG. 1B is a block diagram of one embodiment of a surveillance system in which various aspects of configuring a camera can be implemented.

FIG. 1B is a block diagram of a video surveillance system 100, including a network 12, which can be a closed network, local area network, or wide area network, such as the Internet. A plurality of cameras 14, 16, and 18 are connected to a network 12 to provide real-time video streams. A workstation 22, which can be, for example, a control point in the surveillance system 100, a personal computer, or a user logged into the surveillance system 100 by means of a laptop computer, is connected to the network 12. Cameras 14, 16, and 18 provide video streams to workstation 22 via the network 12. Storage 20 is connected to the network 12 and can be part of another workstation, control point, network manager, system storage or other suitable device. One or more of cameras 14, 16, and 18 can be a movable camera, such as a PTZ camera that allows a user to adjust the pan, tilt, and zoom, and the cameras 14, 16 and 18 can have their own storage for storing presets and tour information.

Figure 2:
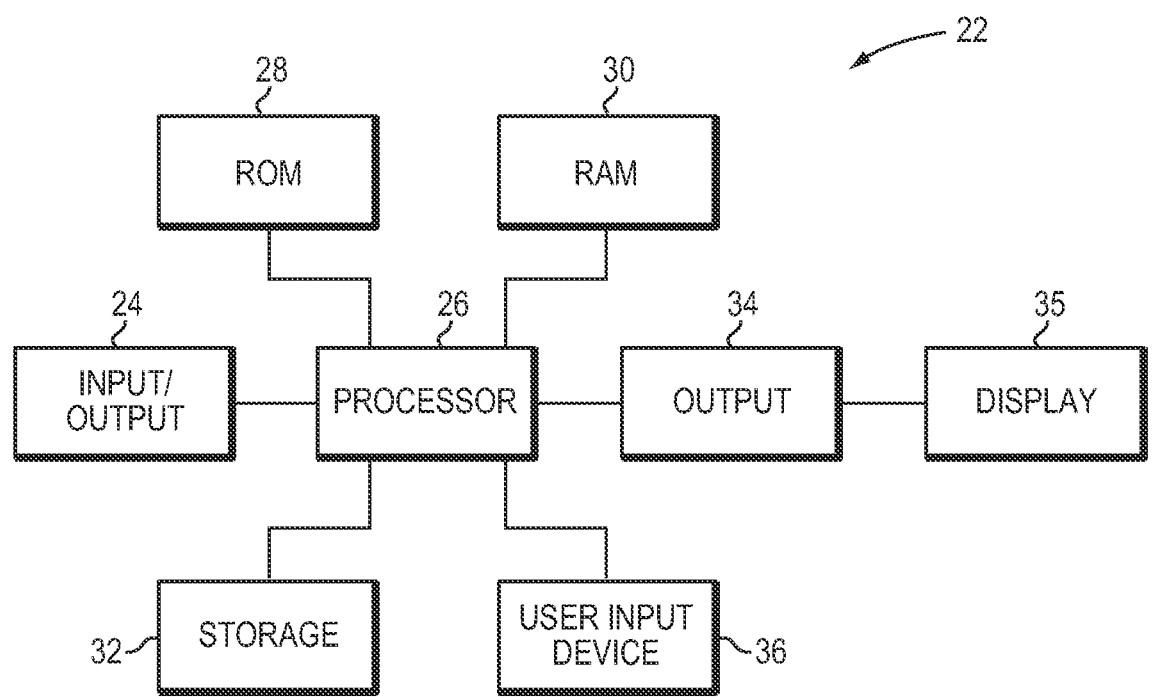
FIG. 2 is an example block diagram of one embodiment of the workstation shown in FIGS. 1A-B.

FIG. 2 is a block diagram of one embodiment of the workstation 22 shown in FIGS. 1A-B. The workstation 22 may include a central or host processor 26, which is connected to input/output 24, ROM 28, RAM 30, video display 35, storage 32 and user input device 36. The user input device 36 may be a keyboard, mouse, controller, or other suitable input device. A processor 26 implements algorithms and programs that are stored in ROM 28 or storage 32, or both, which can be a disk drive for example, or storage 20, which is located elsewhere in network 12, in response to user input from user input device 36 and provides output signals to display 35. Input/output 24 is connected to network 12 to receive the video streams from the cameras 14, 16, and 18, and to send configuration and control signals to the cameras 14, 16, and 18 in FIGS. 1A-B. In addition, input/output 24 also can receive signals from storage 20, such as the computer executable instructions, interchangeably referred to herein as operations, to implement various aspects of configuring cameras 14, 16, and 18. The programs and computer executable instructions stored, for example, in storage 32 are loaded at run time to enable a user to configure one or more of cameras 14, 16, and 18 and/or surveillance system 100 by interacting with the graphical user interface on the display 35 with the user input device 36.

Figure 3:
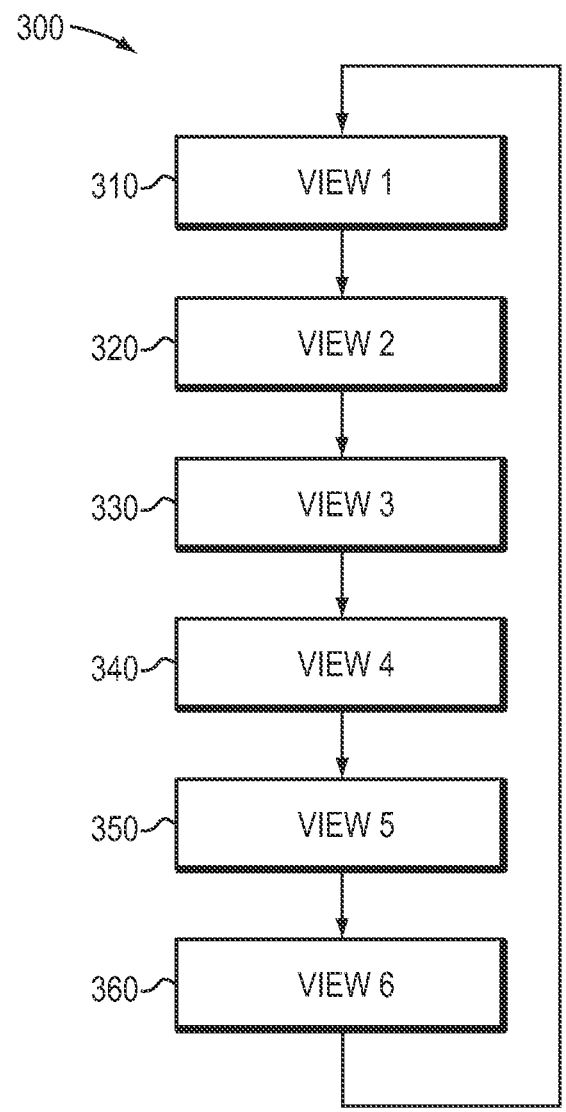
FIG. 3 is a flow diagram of a tour of video camera views in an example embodiment.

FIG. 3 is a flow diagram of a tour 300 in an example embodiment. The tour 300 comprises an ordered sequence of views 310, 320, 330, 340, 350, 360, where each view is a configured view provided by a camera of a video surveillance system, such as the system 100 described above with reference to FIGS. 1A-B. Each view 310-360 can be established by respective view configuration data maintained at a workstation, such as the workstation 22, and can be displayed to a user at a display, such as the display 35 described above with reference to FIG. 2. The view configuration data provides information required to obtain the respective view at a display, such as the identity of a camera and the pan, tilt and zoom coordinates of that camera. If the view includes movement of the camera (i.e., a dynamic rather than static view), the data may also include instructions for adjusting the pan, tilt and zoom of the camera while displaying the view.

During operation of the tour 300, each view 310-360 may be displayed to a user for a preconfigured time period before advancing to a subsequent view. The time for displaying each view 310-360 may be uniform, or may be specific to each view. The tour may advance through each view 310-360 in a repeating, predefined order as shown, or may alternate through multiple view sequences. Alternatively, the tour 300 may advance through the views 310-360 in a random manner.

Several aspects of the tour 300, including the number of views, time period for displaying each view 310-360, the configuration data for each view 310-360 and the order of the views, may be configured by an automated process for configuring a tour, such as the process 600 described below with reference to FIG. 6, alone or in combination with user-defined settings.

Figure 4:
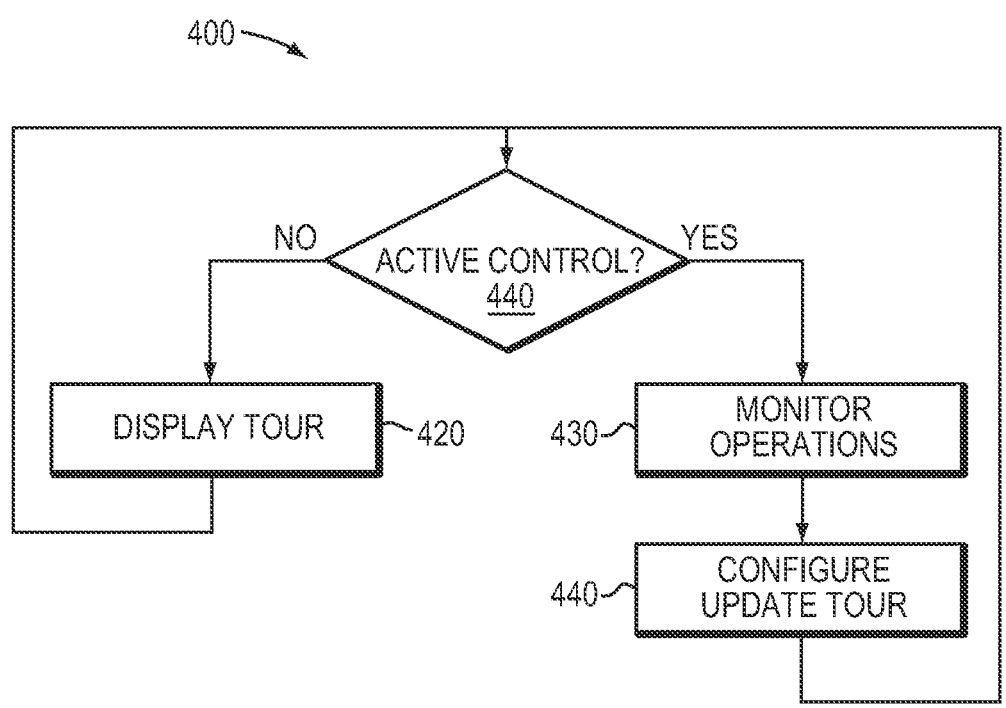
FIG. 4 is a flow diagram of a process of operating a surveillance system in one embodiment.

FIG. 4 is a flow diagram of a process 400 of operating a surveillance system in one embodiment. The process 400 may be implemented by the surveillance system 100 described above with reference to FIGS. 1A-B, and provides for periods of active operation by a user, as well as periods of unmanned operation with display of an automated tour. With reference to FIG. 1B, the system 100 detects user input (e.g., at input/output 24) to determine whether the system 100 is under active control by the user (410). The system may be configured to determine that the system is not under active control only after detecting no user input for a minimum period of time.

If the system 100 is determined not to be under active control, then the system may initiate an automated tour (420). The tour may be comparable to the tour 300 described above with reference to FIG. 3. If the system 100 is determined to be under active control by a user, then the system conducts a process of monitoring operations of the user relating to the cameras (e.g., cameras 14, 16, 18) of the system 100 (430). This process may be comparable to the process 500 described below with reference to FIG. 5. Following (or concurrently with) monitoring the user operations, the system 100 may employ the data collected during the monitoring to configure or update a tour (440). The process of configuring or updating the tour may be comparable to the process 600 described below with reference to FIG. 6. The tour may then be displayed during a period outside of active control by the user (420).

Figure 5:
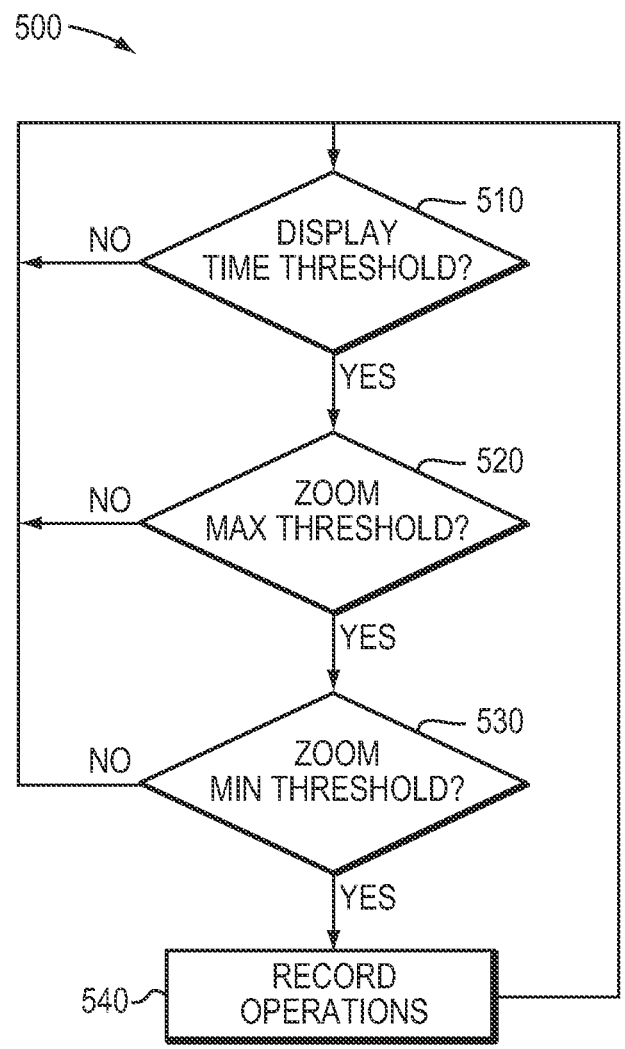
FIG. 5 is a flow diagram of a process of monitoring operations during active control of a surveillance system.

FIG. 5 is a flow diagram of a process 500 of monitoring operations during active control of a surveillance system. The process 500 may be run during a period of active operation of the surveillance system by a user, and may provide for recording data regarding that operation based on predetermined thresholds.

During a period of active operation, a user operates the cameras of a surveillance system to obtain one or more views on a display. For a given view, various characteristics of the view are detected and compared against corresponding thresholds in order to determine whether to record data regarding the view. In a particular example, the display time (i.e., the dwell time within sector view boundaries) of the view is compared against a display time threshold (510), and a zoom level of the view is compared against a zoom maximum threshold (520) and a zoom maximum threshold (530). The display time threshold may be set to exclude recording operations relating to a view displayed for an insubstantial length of time. Likewise, the zoom maximum and minimum thresholds may be set to exclude recording operations relating to a view that is considered too enlarged or diminished to be of value in an automated tour. In further embodiments, other operations of the user, such as pan and tilt coordinates of a camera, may be compared against corresponding thresholds. Data regarding operations passing the aforementioned thresholds may then be recorded (540) for use in configuring a tour.

Figure 6:
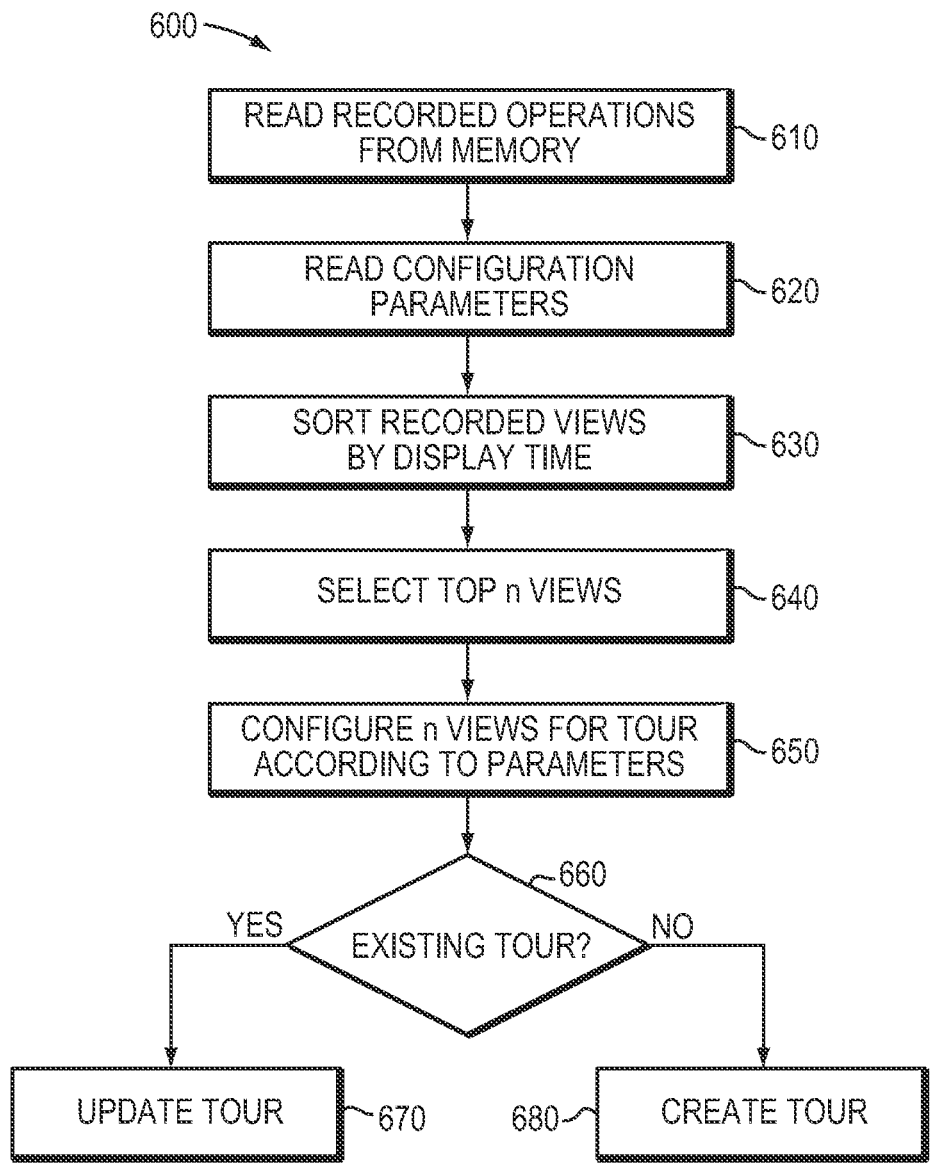
FIG. 6 is a flow diagram of a process of configuring a tour in one embodiment.

FIG. 6 is a flow diagram of a process 600 of configuring a tour. Recorded operations data, as well as configuration parameters, are read from a memory (610, 620). Recorded operations data, which may be organized as "sector entries" corresponding to each recorded view, may include information required to display views corresponding to the recorded operations, such as the identity of a camera and the pan, tilt and zoom coordinates of that camera for a given view, as well as the display time of the view. Configuration parameters may include the parameters of the tour to be configured, such as a number of views to be displayed in the tour, or a total time allocated for the tour.

The views corresponding to the recorded operations data may then be sorted by recorded display time (also referred to as "dwell time") (630). This sorting is one option for arranging the recorded views by priority for purposes of selecting a subset of the views for the tour. However, priority can be assigned to the views by other methods, alone or in combination with sorting by recorded display time. For example, a user, though the user input, may manually mark a view as being important, resulting in the view being included in the tour regardless of the view's display time, or resulting in the view being given higher priority in the sorted views.

Given a sorted list of the recorded views, the top n number of views are selected for inclusion in the tour, where n is the total number of views to be included in a tour according to the configuration parameters (640). The number n may be indicated by the configuration parameters, or may be derived from other configuration parameters such as a total display time of the tour. The selected n views are then configured for the tour according to the parameters (650). For example, the display time for each selected view may be set according to their recorded display time (as an absolute value or as a value relative to the display time of the other selected views), as well as configuration parameters such as a total display time for the tour.

If an existing tour has not yet been created (660), then a new tour is generated using the configured n views (680). If an existing tour has already been generated (660), and the existing tour is to be updated, then the existing tour may be updated by replacing existing views, expanding the tour with additional views, or both (670).

The surveillance system in example embodiments described above may be configured in the following ways:

Record Configuration:
1. Minimum Sector Dwell Time (secs)
   Meaning: Specifies the minimum time the operator must dwell in a sector before it is recorded in the history data that will be analyzed for smart tours.
   Purpose: This setting can be customized to prevent sectors from being recorded in the history when the operator was tracking a subject or quickly scanning an area.
2. Maximum Zoom Level
   Meaning: This setting allows the operator to specify the maximum zoom level allowed during operation before time spent in a sector will not be recorded in the history data for analysis.
   Purpose: This setting can be customized to prevent time when an operator is zoomed in and looking at the detail of a circumstance, from being recorded and considered for smart tour history analysis.
   An example of this is when a particular stretch of highway is being monitored and the operator zooms in on occasion to get detailed video information about a crash or abandoned vehicle on road. The sector the operator zooms into is of no particular interest in general, and only of interest for that specific instance. Here, the smart tour considers general areas operators monitor with the PTZ unit, so setting a max zoom level for smart tour sampling can prevent these situations from being recorded.)
3. Minimum Zoom Level
   Meaning: Same as Maximum but prevents sector history recording when beyond the wide-angle zoom limit.
4. Sector Size—[Large, Medium, Small]
   Meaning: Sets the relative size of the individual sectors dividing up 3D space. For a dome with the range of 90° tilt and 360° pan the sector sizes and number are as follows.
   16 Large Sectors (22.5° height×30° width) [4 across tilt×12 across pan]
   32 Medium (11.25° height×15° width) [8 across tilt×24 across pan]
   64 Small (5.625° height×7.5° width) [16 across tilt×48 across pan]
   Purpose: Having the number of sectors be powers of 2 allows the system to minimize the size of the entries written to memory to be one byte regardless of the sector size selected. Large, Medium, and Small sectors require 4, 5, and 6 bits of each entry byte to represent respectively. This leaves several bits per entry to be used for Run Length Encoding (RLE). Specifically, 4 bits for Large, 3 for Medium, and 2 for Small sector divisions.
   RLE in this case allows a count to be kept in each entry representing the number of intervals spent in a certain sector in a row without requiring multiple entries.
   Max RLE count value:
   Large=16
   Medium=8
   Small=4

Memory Allocation

Meaning: Allows the user to select the amount of memory used for entries, thereby controlling the recordable interval time (see reference information below).

Note: On some systems, this may be some max limit allowed, and the user selects only to further limit the memory used to modify the Min/Max 'Recordable Interval Time' in the usage history/

Reference Information: Recordable History

Meaning: Recordable History (Max [time units])

Purpose: Represents the maximum amount of recorded history that can be stored in the allocated memory.

Note: This excludes operation time that does not meet the constraints set by the user for Minimum Sector Dwell Time, Maximum Zoom Level, and Minimum Zoom Level.

The recordable history can be calculated as follows:

MEM=Memory (in bytes)

MSIT=Minimum Sector Interval Time (in Seconds)

MRLE=Max RLE Count (see above values for Large/Medium/Small)

Max (Hours): MEM×MSIT×MRLE÷60÷60

Max (Days): MEM×MSIT×MRLE÷60÷60÷24

The reference information is typically displayed in the most appropriate time unit format.

Playback Configuration:

1. Tour Sector Count

Meaning: This allows the user to select how many of the top sectors to "tour".

2. Tour Sector Dwell Time Mode

Meaning: User selects how dwell time is determined for sector tour playback
  i. Proportional:
     Dwell time for the number of sectors chosen for "Tour Sector Count" is proportional to the relative time spent in that 'top' sector compared to the other 'top' sectors.
  ii. Fixed:
     For this mode, the user selects a fixed length of time to spend at each 'top' sector in the sequence.
  iii. Random:
     For this mode, the user provides Minimum and Maximum dwell times in seconds to spend at each 'top' sector, and the system randomly selects a dwell time at each step when sequencing through them.

3. Tour Magnification Mode

Meaning: This setting can be used to set the magnification level used in the smart sector tour playback.
  i. 1× Zoom (Default)
  ii Sector Framing
  This selection chooses a magnification that best visibly frames the sector in the tour.

Implementation Considerations

During operation, the system tracks in what sector the camera is pointing. If the configurable record conditions are met for smart tours (e.g., dwell, zoom min&max level), then the RLE count for the time spent in that sector is tracked until the user leaves the sector, the Max RLE count is reached, or the zoom min/max constraint is broken. At that point, the sector entry is written to the revolving history of entries allocated in memory.

Sector Boundaries

Based on the sector size selected by the user, a table can be calculated for the sector pan/tilt boundaries for easy runtime lookup in order to speed up the process of determining to what sector the camera is currently pointed.

Memory Analysis

On startup, counts for each sector stored in memory are tallied. During runtime, the counts are kept up to date. If the revolving history is full, any new entry overwrites the oldest entry. On this condition, the count for the oldest entry is subtracted from that sector, and the new entry count is added to that sector count.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

While this invention has been particularly shown and described with references to example embodiments thereof, it will be understood by those skilled in the art that various changes in form and details may be made therein without departing from the scope of the invention encompassed by the appended claims.

What is claimed is:

1. A method of operating a video surveillance system, comprising:
  detecting a period of active control of the video surveillance system by an operator, the period of active control being a state of the video surveillance system that is determined based on detecting whether manual selection and adjustment of camera views of the video surveillance system by the operator exceeds a minimum threshold of time;
  monitoring a plurality of operations performed by the operator during the period of active control;
  generating a record of the plurality of operations performed by the operator, the record including at least one display time of a view selected by the operator during the plurality of operations;
  configuring a tour automatically during the period of active control based on at least a subset of the plurality of operations and the at least one display time, the subset including manual selection and adjustment of camera views of the video surveillance system by the operator, the configuring comprising automatically determining which operations to exclude from the tour based on predetermined thresholds; and
  enabling the video surveillance system to conduct the tour outside the period of active control, the conducting including selecting and adjusting the camera views of the video surveillance system.

2. The method of claim 1, wherein detecting the period of active control includes detecting a minimum threshold of activity by the operator.

3. The method of claim 1, wherein configuring the tour includes configuring at least one of a sequence of camera views, coordinates of a camera view, and a display time for each camera view.

4. The method of claim 3, wherein the coordinates of a camera view indicate at least one of a pan, tilt, and zoom of a camera.

5. The method of claim 3, wherein the coordinates of a camera view correspond to a camera view monitored during the period of active control.

6. The method of claim 3, wherein the display time for each camera view corresponds to a relative priority of each camera view based on the plurality of operations.

7. The method of claim 3, further comprising controlling a camera to obtain a camera view of the sequence of camera views.

8. The method of claim 7, wherein controlling the camera includes controlling at least one of a pan, tilt, and zoom of the camera.

9. The method of claim 1, wherein monitoring the plurality of operations includes selecting only the subset of the plurality of operations and configuring the tour based on the subset.

10. The method of claim 9, wherein selecting at least the subset is based on a display time of a camera view.

11. The method of claim 9, wherein selecting at least the subset is based on a zoom level of a camera view.

12. The method of claim 1, wherein the predetermined thresholds include thresholds of at least one of a minimum display time, minimum camera zoom, and maximum camera zoom.

13. The method of claim 1, wherein the plurality of operations include at least one of coordinates of a camera view and display time of a camera view.

14. The method of claim 13, wherein the coordinates of a camera view indicate at least one of a pan, tilt, and zoom of a camera controlled by the operator.

15. The method of claim 1, wherein the tour is repeated continuously outside the period of active control.

16. The method of claim 1, further comprising terminating the tour in response to detecting activity by the operator.

17. A non-transitory computer readable medium comprising instructions that, when read by a computer controlling a video surveillance system, cause the computer to:

detect a period of active control of the video surveillance system by an operator, the period of active control being a state of the video surveillance system that is determined based on detecting whether manual selection and adjustment of camera views of the video surveillance system by the operator exceeds a minimum threshold of time;

monitor a plurality of operations performed by the operator during the period of active control;

generate a record of the plurality of operations performed by the operator, the record including at least one display time of a view selected by the operator during the plurality of operations;

configure a tour automatically during the period of active control based on at least a subset of the plurality of operations and the at least one display time, the subset including manual selection and adjustment of camera views of the video surveillance system by the operator, the instructions causing the computer to configure the tour by automatically determining which operations to exclude from the tour based on predetermined thresholds; and causing the video surveillance system to conduct the tour outside the period of active control, the tour including selecting and adjusting the camera views of the video surveillance system.

18. A surveillance system comprising:

a plurality of video cameras; and a workstation configured to control the plurality of video cameras and receive respective views from the plurality of video cameras, the workstation comprising:

a user input device configured to enable user control of the plurality of video cameras, a display configured to display the respective views from the plurality of video cameras, and a processor configured to:

generate a record of the plurality of manual operations performed by the operator during a period of active user control, the record including at least one display time of a view selected by the operator during the plurality of operations, and configure a tour automatically during the period of active user control based on the manual operation of the user input device and the at least one display time, the processor configured to configure the tour by automatically determining which operations to exclude from the tour based on predetermined thresholds, and cause at least one camera among the plurality of video cameras to conduct the tour outside the period of active user control, conducting the tour including selecting and adjusting the camera views of the video surveillance system, the operation of the user input device including manual selection and adjustment of camera views of the video surveillance system, the period of active control being a state of the video surveillance system that is determined based on detecting whether the manual selection and adjustment of camera views of the video surveillance system exceeds a minimum threshold of time.

19. The system of claim 18, wherein the processor is further configured to detect the period of active user control based on operation of the user input device.

20. The system of claim 18, wherein the processor is further configured to monitor the operation of the user input device.

* * * * *